United States Patent
Weichel et al.

(10) Patent No.: US 6,877,305 B2
(45) Date of Patent: Apr. 12, 2005

(54) METHOD AND DEVICE FOR DETECTING A THICKENING IN A RUNNING THREAD

(75) Inventors: Andreas Weichel, Usingen (DE); Stefan Seibel, Maintal (DE)

(73) Assignee: Zimmer Aktiengesellschaft, Frankfurt am Main (DE)

( * ) Notice: Subject to any disclaimer, the term of this patent is extended or adjusted under 35 U.S.C. 154(b) by 162 days.

(21) Appl. No.: 10/204,176

(22) PCT Filed: Feb. 22, 2001

(86) PCT No.: PCT/EP01/02010

§ 371 (c)(1),
(2), (4) Date: Dec. 2, 2002

(87) PCT Pub. No.: WO01/63203

PCT Pub. Date: Aug. 30, 2001

(65) Prior Publication Data

US 2003/0121246 A1 Jul. 3, 2003

(30) Foreign Application Priority Data

Feb. 23, 2000 (DE) ........................................ 100 08 353

(51) Int. Cl.[7] .............................................. D01H 13/26
(52) U.S. Cl. ........................................ 57/264; 57/265
(58) Field of Search ................... 57/264, 265; 28/173, 28/185, 227–231, 186, 189; 19/0.23; 242/380

(56) References Cited

U.S. PATENT DOCUMENTS

| | | | | | |
|---|---|---|---|---|---|
| 1,025,158 | A | * | 5/1912 | Rand | 28/189 |
| 1,585,315 | A | * | 5/1926 | Perrin | 28/228 |
| 1,905,259 | A | * | 4/1933 | Abbott | 28/229 |
| 2,036,806 | A | * | 4/1936 | Hill et al. | 28/227 |
| 3,758,925 | A | * | 9/1973 | Desaulniers et al. | 28/229 |
| 5,074,485 | A | * | 12/1991 | Schilling | 242/157 R |
| 5,544,503 | A | * | 8/1996 | Miyamoto | 66/146 |

FOREIGN PATENT DOCUMENTS

JP          2000045139 A   *   2/2000   .......... D01H/13/04

* cited by examiner

*Primary Examiner*—John J. Calvert
*Assistant Examiner*—Shaun R Hurley
(74) *Attorney, Agent, or Firm*—Norris McLaughlin & Marcus PA

(57) ABSTRACT

The invention relates to a method and to a device for detecting a thickening in a running thread. The thread runs through a forked guide element which is moved away from an initial position by a thickening in the thread, thereby triggering a signal. While the guide element is moved away, it allows the thread having the thickening to continue running and is then returned to its initial position.

12 Claims, 1 Drawing Sheet

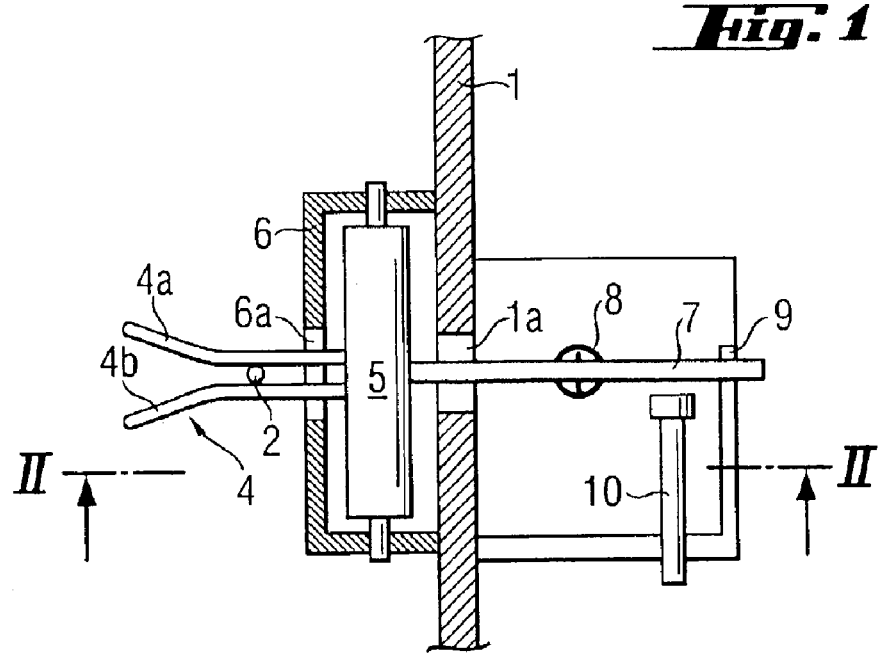
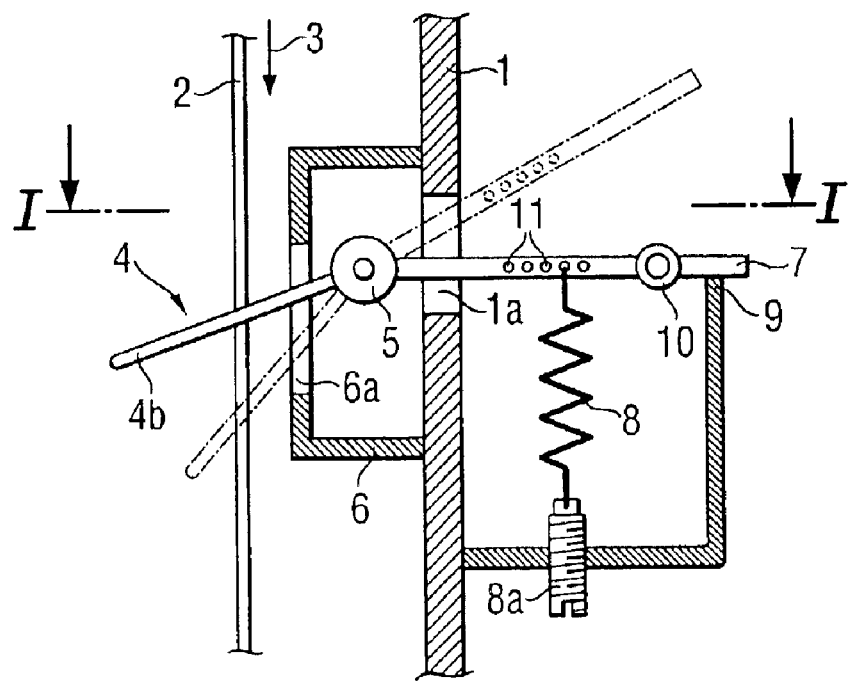

METHOD AND DEVICE FOR DETECTING A THICKENING IN A RUNNING THREAD

This invention relates to an apparatus for detecting slubs in a running thread or bundle of fibers, comprising a fork-like guiding member fixed at one end, which can be deflected in running direction of the thread or bundle of fibers and can be returned to the starting position by spring force, through whose gap of adjustable width the thread or the bundle of fibers is running, and which is coupled with a movement detector.

Detectors for detecting slubs have already been used, in which the thread or the bundle of fibers passes through a gap between two plates, one plate being pivotally mounted. The gap is defined by the parallel edges of the two plates; a slub in the thread or in the bundle of fibers swivels the movable plate downwards, and this swivel movement is detected by a detector. This system is rather sluggish and furthermore has the disadvantage that slubs get caught at the plate edges, which frequently leads to broken threads. Agglutinations as a result of lubricant deposits make the known system even more sluggish in operation, and cleaning is necessary relatively frequently. For this purpose, the spinning operation must disadvantageously be interrupted. In CA 911717 A, a similar apparatus is described, in which the thread or the bundle of fibers passes through the gap of a fork-like guiding member formed by a leaf spring fixed at one end. In the case of a slub of the thread or the bundle of fibers, the guiding member is slightly deflected in running direction of the thread or the bundle of fibers. By means of the strain gauge mounted on the leaf spring, the amount of deflection is detected and evaluated for instance by means of a frequency detector.

It is the object underlying the invention to remedy this deficiency and detect slubs in a running thread or a bundle of fibers in a simple and operationally reliable way. The thread or the bundle of fibers with the slub should be able to run on easily, as it is advantageous in particular for spinning plants.

In accordance with the invention, this object is solved in that the guiding member is attached to an axis of rotation, and the portion facing away from the axis of rotation of the gap which is parallel in the portion facing the axis of rotation is divergent. The thread or the bundle of fibers is running through the gap of the guiding member, which a slub of the thread or bundle of fibers moves away from its starting position in running direction of the thread or the bundle of fibers, a signal being triggered by the movement. The signal indicating the movement may be of a mechanical, optical, acoustical, electric or electromagnetic nature.

Further advantageous aspects of the apparatus as claimed in claim 1 are included in claims 2 to 6.

The guiding member cooperates with a helical spring such that the guiding member which has been moved away from the starting position by a slub of the thread or bundle of fibers is returned to its starting position.

The apparatus in accordance with the invention is represented in the drawing by way of example and will be explained below. In the drawing:

FIG. 1 shows the apparatus in a horizontal section along line I—I of FIG. 2 in a schematic representation, and FIG. 2 shows the apparatus in a vertical section along line II—II of FIG. 1.

On a vertical wall(1), which for instance belongs to a spinning plant, the apparatus for detecting slubs in a thread (2) is disposed. In FIGS. 1 and 2 it is assumed that the thread(2) is moving vertically from the top to the bottom in the direction of the arrow(3), for instance through a draw-off mechanism which is not shown here.

The thread(2) passes through a fork-like guiding member (4), whose gap is formed by the two pins(4a, 4b). The pins(4a, 4b), which may be ceramic-coated pins, form a parallel gap in the portion facing the axis of rotation(5) and a diverging gap in the portion facing away from the axis of rotation(5). The spacing of the pins(4a, 4b) may be adjustable, which is, however, not represented in the drawing.

The guiding member(4) is attached to the horizontal axis of rotation(5), which is pivotally mounted in the housing(6). Through an opening(6a) in the housing(6) the guiding member(4) extends to the outside. To the axis of rotation(5), there is connected a lever arm(7) serving as signal arm, which by means of a helical spring (8) can be moved back into the starting position to a stationary stop(9), cf. FIG. 2. The lever arm(7) extends through an opening(1a) in the vertical wall(1).

When the running thread(2) has a slub, the slub briefly exerts a force acting in running direction of the thread(2) onto the guiding member(4), which force swivels the guiding member(4) downwards, as is represented in FIG. 2 in broken lines. The impact caused by the slub is relatively small, and the slub itself can slide downwards on the pins(4a, 4b). Due to the diverging enlargement of the spacing of the pins(4a, 4b) in the portion facing away from the axis of rotation(5), the guiding member(4) again releases the thread after a short swivel movement, which thread can thus run on undisturbed. At the same time, the guiding member(4), which has been returned by the spring force of the helical spring(8), swivels back into the starting position. When the thread(2) comes from a spinning plant, it has already cooled down when reaching the guiding member(4) and is no longer or hardly plastic.

The construction has been made such that agglutinations and malfunctions, in particular due to lubricant being deposited, cannot occur. This is achieved by enclosed bearings and a largely closed housing(6).

When the guiding member(4) is swivelled in running direction of the thread(2), the lever arm(7) is swivelled upwards, as is represented in FIG. 2 in broken lines. The lever arm (7) moves away from the range of action of a detector(10), which is stationarily mounted. This movement of the lever arm(7) is indicated by the detector(10) in a manner known per se, so that for instance the attraction of an operator is attracted. The operator now is able to take the necessary measures and perform for instance cleaning work on the spinning plant. To be able to change the restoring force of the helical spring(8), the lever arm(7) has a plurality of eyelets(11), into which the helical spring(8) can optionally be hung. In addition, the helical spring(8) can be connected with a system of adjustable length, e.g. a threaded pin(8a), cf. FIG. 2, so that an infinitely variable adjustment of the spring force is possible.

What is claimed is:

1. An apparatus for detecting slubs in a running thread or bundle of fibers, said apparatus comprising a forked guiding member fixed at one end thereof, which forked guiding member can be deflected from a starting position in a running direction of the thread or bundle of fibers and can be returned to the starting position by spring force, said forked guiding member comprising a gap of adjustable width through which the thread or bundle of fibers run, said forked guiding member being connected with a movement detector, wherein the forked guiding member is attached to an axis of rotation, and a portion of the forked guiding member farthest from the axis of rotation diverges from a line perpendicular to the axis of rotation.

2. The apparatus as claimed in claim 1, wherein on a side of the axis of rotation opposite that to which the guiding member is attached, a lever arm is mounted, which lever arm is connected to a helical spring and serves as a signal arm.

3. The apparatus as claimed in claim 2, wherein the helical spring has a restoring force that is adjustable.

4. The apparatus as claimed in claim 1, wherein the starting position of the forked guiding member is inclined with respect to a horizontal plane containing the axis of rotation.

5. The apparatus as claimed in claim 1, wherein the forked guiding member comprises two pins defining the gap.

6. The apparatus as claimed in claim 1, wherein the components providing for the deflection of the guiding member are enclosed.

7. A method of detecting slubs in a running thread or bundle of fibers, said method comprising the following steps:

a) providing an apparatus according to claim 1;

b) running said thread or bundle of fibers through said gap; and c) detecting a deflection of said forked guiding member from said starting position through said movement detector to give a detection of said slubs.

8. The method as claimed in claim 7, wherein in said apparatus on a side of the axis of rotation opposite that to which the guiding member is attached, a lever arm is mounted, which lever arm is connected to a helical spring and serves as a signal arm.

9. The method as claimed in claim 8, wherein in said apparatus the helical spring has a restoring force that is adjustable.

10. The method as claimed in claim 7, wherein in said apparatus the starting position of the forked guiding member is inclined with respect to a horizontal plane containing the axis of rotation.

11. The method as claimed in claim 7, wherein in said apparatus the forked guiding member comprises two pins defining the gap.

12. The method as claimed in claim 7, wherein in said apparatus the components providing for the deflection of the guiding member are enclosed.

\* \* \* \* \*

UNITED STATES PATENT AND TRADEMARK OFFICE
CERTIFICATE OF CORRECTION

| | |
|---|---|
| PATENT NO. | : 6,877,305 B2 |
| APPLICATION NO. | : 10/204176 |
| DATED | : April 12, 2005 |
| INVENTOR(S) | : Weichel et al. |

It is certified that error appears in the above-identified patent and that said Letters Patent is hereby corrected as shown below:

Column 1, Lines 51-52, Paragraph which begins "Further advantageous" delete entirely Column 1, Line 57, Insert -- Brief Description of the Drawings --

Signed and Sealed this

Fifth Day of June, 2007

JON W. DUDAS
*Director of the United States Patent and Trademark Office*